(12) United States Patent
Rogers

(10) Patent No.: US 7,395,540 B2
(45) Date of Patent: Jul. 1, 2008

(54) AUTOMATED BUSINESS SOFTWARE APPLICATION INTEGRATION

(75) Inventor: Daniel J. Rogers, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 879 days.

(21) Appl. No.: 10/726,879

(22) Filed: Dec. 3, 2003

(65) Prior Publication Data

US 2004/0181471 A1 Sep. 16, 2004

Related U.S. Application Data

(60) Provisional application No. 60/454,537, filed on Mar. 12, 2003.

(51) Int. Cl.
*G06F 3/00* (2006.01)
*H04L 9/00* (2006.01)

(52) U.S. Cl. .................................. 719/310; 705/50

(58) Field of Classification Search ................. 719/310; 705/50
See application file for complete search history.

(56) References Cited

U.S. PATENT DOCUMENTS

| 6,295,571 | B1 * | 9/2001 | Scardamalia et al. | 710/308 |
| 6,996,500 | B2 * | 2/2006 | O'Konski et al. | 702/186 |
| 7,188,155 | B2 * | 3/2007 | Flurry et al. | 709/219 |
| 2007/0226093 | A1 * | 9/2007 | Chan et al. | 705/35 |

OTHER PUBLICATIONS

Sonera Plaza, Web Services White paper, Jun. 12, 2002.*
Anders Grangard, Colin Barhamn, Al Boseman, et al., "ebXML Technical Architecture Specification v1.0.4," Feb. 16, 2001, www.ebxml.org/specs/ebTA.pdf.
Erich Gamma, Richard Helm, Ralph Johnson, John Vlissides, "Design Patterns," 1995, pp. 139-150, XP-002300252.
European Search Report, Application No. 04005827.3; filed: Mar. 11, 2004.
European Official Action from Application No. 04005827.3; filed: Mar. 11, 2004.
Linthicum, "Should You Wait for Application Integration Standards to Mature? Don't Make a Terrible Mistake," eAI Journal, Aug. 2002.
Apte, "Designing an Integration-Ready Application," iConexio Technologies Canada Inc., 2002.
A Darwin Partners and ZapThink Insight, "Using Web Services for Integration," Darwin Partners and ZapThink, LLC, 2002.
Sonera Plaza Ltd, "Web Services White Paper," Sonera Plaza MediaLab, 2002.
European Official Communication from Application No. 04005827.3; filed: Mar. 11, 2004.
Boggs, et al., "Mastering UML with Rational Rose," 1999 Sybex Inc., 1151 Marina Village Parkway, Alameda, CA.

* cited by examiner

*Primary Examiner*—Meng-Ai An
*Assistant Examiner*—Lechi Truong
(74) *Attorney, Agent, or Firm*—Christopher R. Christenson; Westman, Champlin & Kelly, P.A.

(57) ABSTRACT

Automatic business software application is provided. Aspects of business, including objects and activities are classified and described in a comprehensive, standard manner. When a business software component is installed, a discovery manager identifies capabilities and requirements of the software based upon information describing the software in accordance with the standardized classification. The software component is selectively bound to one or more roles of a model-driven bus. In some aspects, a standardized software adapter is able to facilitate use of embodiments of the present invention with prior art software systems. Additional software layers and overhead facilitate the management and operation of multiple software components.

10 Claims, 9 Drawing Sheets

AUTOMATED BUSINESS SOFTWARE APPLICATION INTEGRATION

CROSS-REFERENCE OF CO-PENDING APPLICATIONS

The present application claims priority to previously filed now abandoned provisional application Ser. No. 60/454,537, filed Mar. 12, 2003, entitled Application Integration by Applying Automated Configuration of Process and Workflows by Applying Prescriptive Taxonomies, Data Models and Schemas to Adaptive Control Fabric.

BACKGROUND OF THE INVENTION

The present invention relates to business software solutions. More specifically, the present invention relates to integrating business software applications automatically by applying prescriptive taxonomies, data models and schemas.

Integrated business software solutions typically include multiple functional products that support business segments and interact with enterprise hub and spoke networks. Such products include software applications related to financial information, human resource management, customer relationship management, professional services automation, distribution, supply chain management, and more.

Individual business software solutions have typically been provided by software vendors that generally provide an application development environment to allow the software to be customized for individual business applications. Traditionally, these business software solutions were designed as relatively stand-alone offerings in that they were complete in their database, data model, automation interface, screen technology, screens, and customization tools. Thus, a user of such solutions would purchase a given solution from a vendor; customize the solution for the specific business requirement; and provide the customized solution to an end user. Examples of business solutions include software systems sold under the trade designations: Solomon, Axapta, and Navision all of which are available from Microsoft Corporation of Redmond, Wash.

As a given customer's needs change, the customer may wish to add additional functionality to their business solution. This was typically done by either buying a new business solution that was capable of providing such features, or buying an add-on business solution that could be configured to cooperate with the legacy business solution. Difficulties generally arise whenever two discrete software systems are used in conjunction with one another, which software systems had not been designed for interoperation together. This problem gave rise to an industry that could generate customized interface adapter software to allow one software system to communicate with another software system. Generally, such adapters are one example of software known as middleware. The necessity of middleware and the degree to which it is focused upon individual combinations of software systems and business environments generally caused a significant increase in the overall system implementation cost because relatively large amounts of highly skilled software development engineer time was required. The design and implementation of middleware can include any number of known methods and techniques for interacting with business software systems. These can include techniques as simple as keystroke injection, screen shot analysis, interaction with the individual databases of the software systems, modification of the source code of the various software systems, or simply the provision of an adapter application that receives an output from one application, transforms the output into suitable input for the second application and feeds the input to the second application.

Another way that businesses adapt their application to changing business needs involves making customizations to the applications they have. Customizations are often applied at the time a new application is sourced, whether as a new purchase or as an adjunct purchase to meet the need described above. The challenge that business software vendors face is supporting this end customer requirement for customizable applications. There are a number of different techniques which have been conventionally used in order to enable a given system to be customized. These include source code customization approaches as well as integrated tool based approaches that allow end customers to add fields to tables and forms themselves. Each of the techniques listed above generally increases overall system cost, either by increasing the cost of developing the application in the first place, or passing the customization development burden on to the end customer. One example, source code modification, entails providing customers with copies of the source code for the product. It thus allows a well-trained practitioner to change significant portions of an application. Those changes can be made to look as if they are part of the product because, in effect, they are part of the modified source code product.

However, source code modification carries with it significant drawbacks. For example, source code modification costs a significant amount of money prior to using the product, because the user or customer must often hire expensive consultants and developers who have been specifically trained in the nuances of how the product is built. The user must then endure the risk of estimating a problem, which is a very difficult and imprecise task. Even if these problems can be overcome and persevered, the result is modified source code. When the manufacturer of the original source code for the modified application ships additional software, such as bug fixes, updates, and new versions, the customer is either forced to again hire talented engineers or developers (and hopefully the same ones who made the original modifications), in order to merge those modifications into the new source code shipped by the manufacturer, and to resolve issues, one-by-one, as they arise in the newly modified source code. Alternatively, the user can simply go without the bug fixes and new features that may benefit the user's business.

All of the above problems set forth with respect to source code modification are equally present with respect to the creation of individual software adapters that act in conjunction with middleware to go between discrete business software solutions. An adapter is generally configured to transform the given output from a first software system, for example, a customer ID number to a usable input for a second system. For example, the customer ID field in one system may need to be changed from a character string to a long integer to import the data into a second system. A change to the first system as simple as padding the customer ID number string with a letter prefix can cause the application integration adapter to fail because the prefix cannot be converted.

Most forms of middleware and/or adapters that are based on data transformation result in a relatively brittle set of code and/or cooperative software components. The fragile nature of adapter based integration approaches complicates the decision to apply important software updates to any of the components of an integrated set of software. Integration strategies based on middleware and adapters break down due to inherent fragility as well as the expense of reintegrating the entire system whenever an update to any of the individual systems is performed.

A new system for automatically integrating discrete standalone business solutions in a manner that is extensible, stable, and automatic is needed. Such a system would allow competing (and cooperating) software vendors to design and provide components that could easily be integrated into a business solution with minimal customization cost while similarly not adversely affecting system stability. Finally, such a system would be easily amenable to patches and updates such that individual product improvements could be easily applied to address concerns, shortcomings, and/or vulnerabilities that may be discovered in the future.

SUMMARY OF THE INVENTION

Automatic business software application is provided. Aspects of business, including objects and activities are classified and described in a comprehensive, standard manner. When a business software component is installed, a discovery manager identifies capabilities and requirements of the software based upon information describing the software in accordance with the standardized classification. The software component is selectively bound to one or more roles of a model-aware bus. In some aspects, a standardized software adapter is able to facilitate use of embodiments of the present invention with prior art software systems. Additional software layers and overhead facilitate the management and operation of multiple software components.

DETAILED DESCRIPTION OF ILLUSTRATIVE EMBODIMENTS

The present invention involves a framework for supporting business applications. However, prior to describing the present invention in greater detail, one exemplary computing environment in which the present invention can exist is described.

Figure 1:
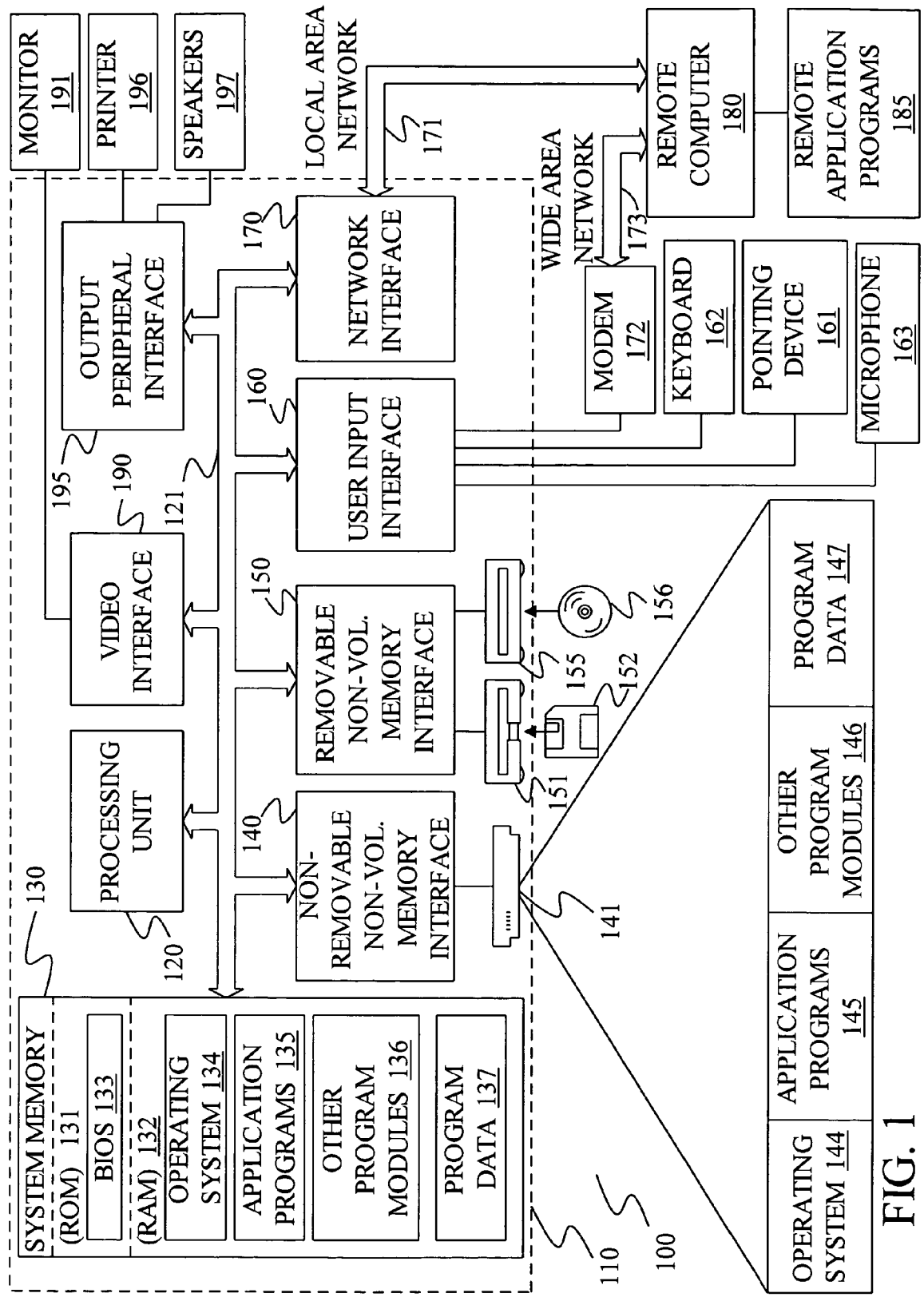
FIG. 1 illustrates an example of a suitable computing system environment 100 on which the invention may be implemented.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that each perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other-means of establishing a communications link between the computers may be used.

Figure 2:
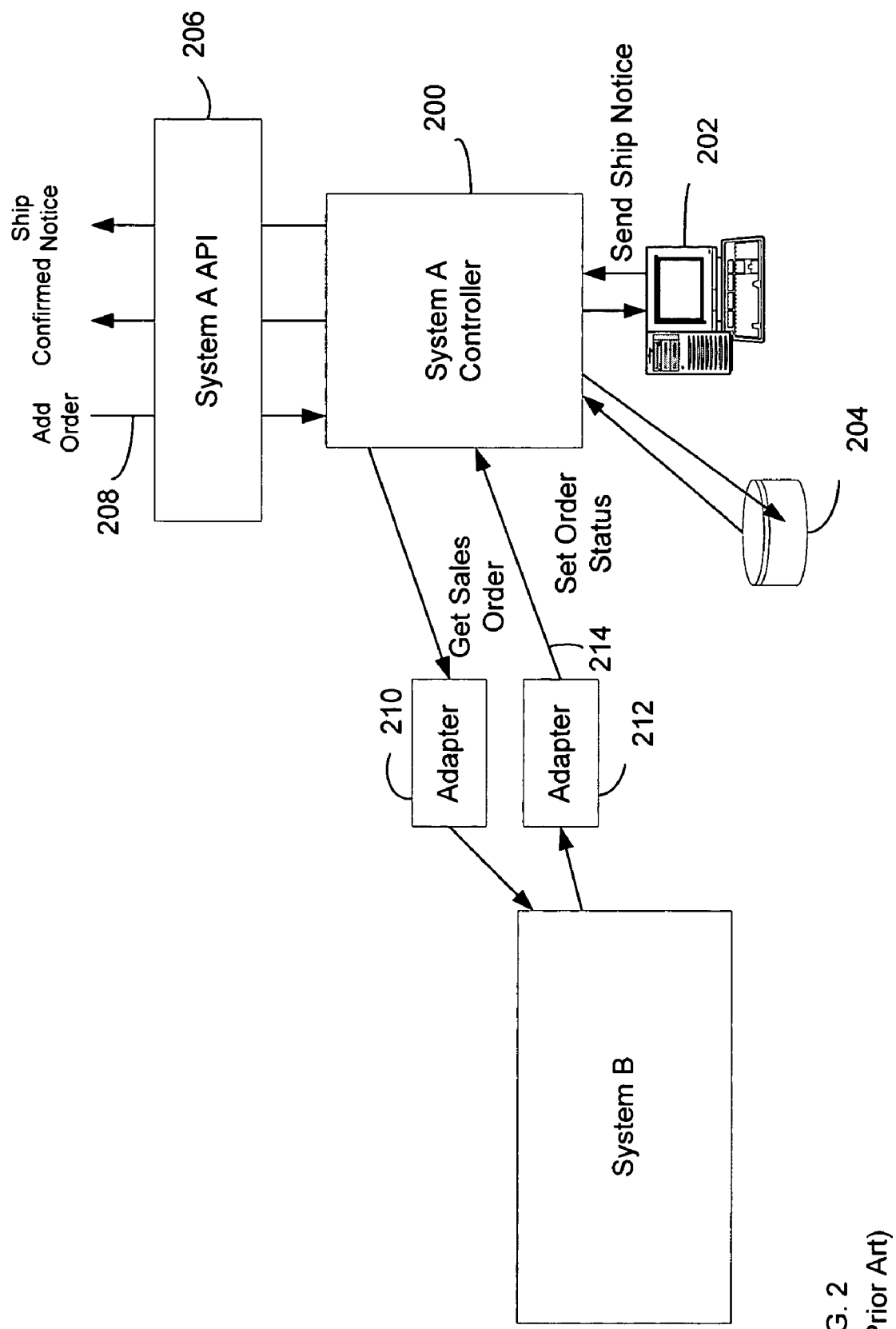
FIG. 2 is a diagrammatic view of interoperation of a pair of business software solution systems in accordance with the prior art.

FIG. 2 is a diagrammatic view of interoperation of a pair of business software solution systems in accordance with the prior art. System A controller 200 is coupled to and may include screens 202 and database 204. Controller 200 also includes its own business application logic that is coupled to System A API 206 so that a user could, for example, add an order as indicated at arrow 208. As illustrated, System B has been integrated with System A using a pair of adapters 210, 212. Adapters 210 and 212 are specifically designed to provide interoperation between System A and System B based on the exact state of System A and System B when adapters 210 and 212 are designed. Accordingly, should one of Systems A or B be upgraded or changed, even in a minor fashion, the efficacy of adapters 210 and 212 can be drastically diminished if not destroyed.

In FIG. 2, an entity knowing that a business that it wishes to communicate with is running System A, sends an Add.Order request to System A through System A API 206 as indicated on line 208. The order went through System A controller 200 and was written to database 204. The order, apparent on screen 202, was then transmitted to System B as a Sales.Order via adapter 210. The order status output of System B in response to the Sales.Order request is transformed by adapter 212 to enter System A as Order.Status as indicated at line 214. The operation described with respect to FIG. 2 is a classic example of middleware (specifically adapters 210, 212) acting to allow two discrete business software solution systems to communicate and interoperate with one another. If, in the future, System B is replaced with System C, or even upgraded to a version of System B', adapters 210 and 212 will need to be rewritten.

Figure 3:
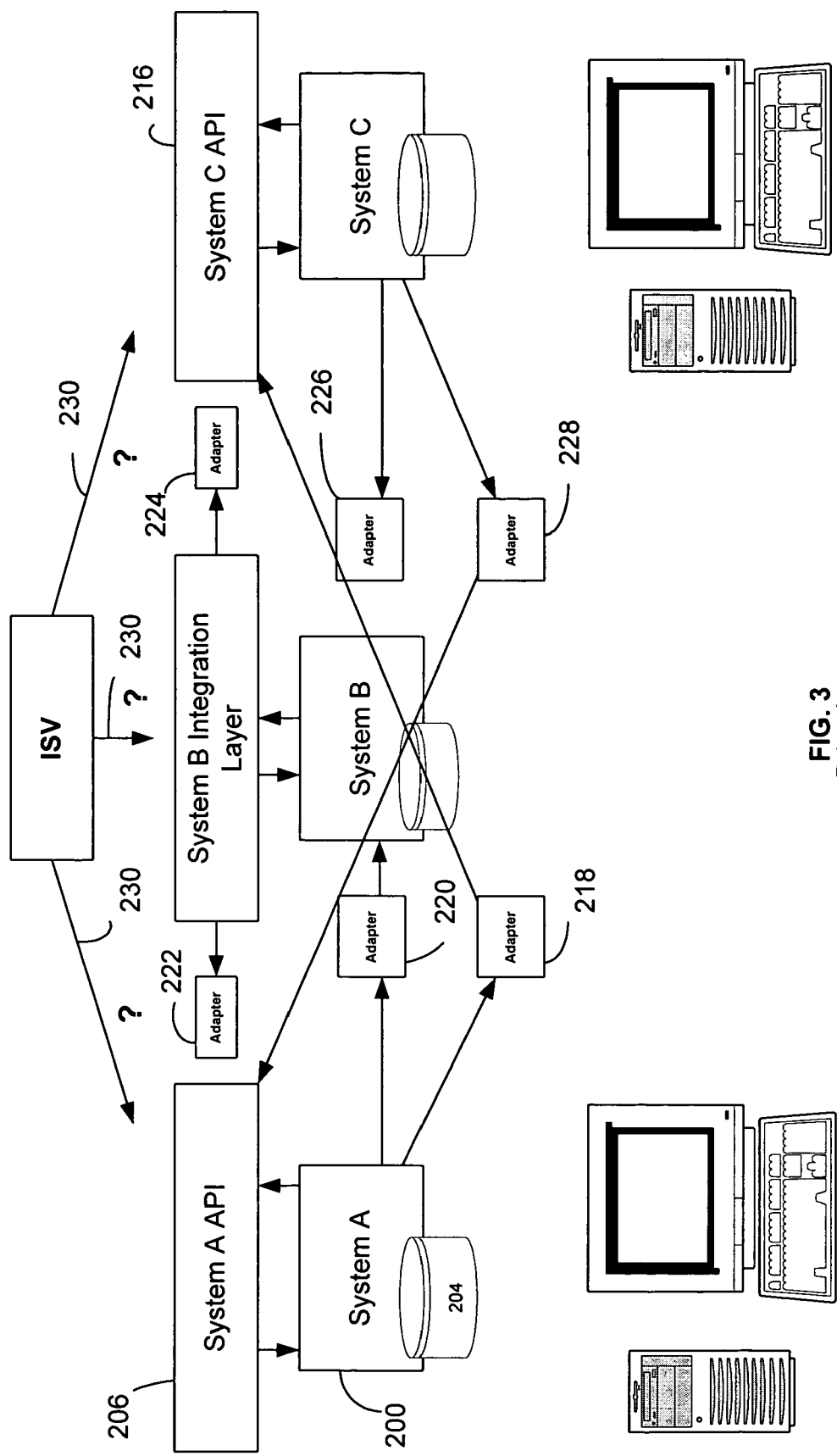
FIG. 3 is a diagrammatic view of another prior art business solution illustrating how problems of the prior art grow in complexity as the number of deployed business software systems increases.

FIG. 3 is a diagrammatic view of another prior art business solution illustrating how problems of the prior art grow in complexity as the number of deployed business software systems increases. FIG. 3 illustrates System A controller, 200, coupled to System A API 206 and database 204. System A interacts with System C API 216 through customized adapter 218 that is specifically designed to facilitate interactions between System A and System C. System A is also able to interact with System B through customized adapter 220. System B can interact with Systems A and C through adapters 222, 224, respectively. Finally, System C is able to interact with Systems B and A through adapters 226 and 228, respectively. FIG. 3 illustrates not only the significant increase in the number of customized adapters that must be used when multiple business software systems are deployed, but also the fact that an independent software vendor wishing to design software to interact with the 3-System solution does not know to which API the new software should be designed. This ambiguity is illustrated by lines 230 labeled with question marks.

Figure 4:
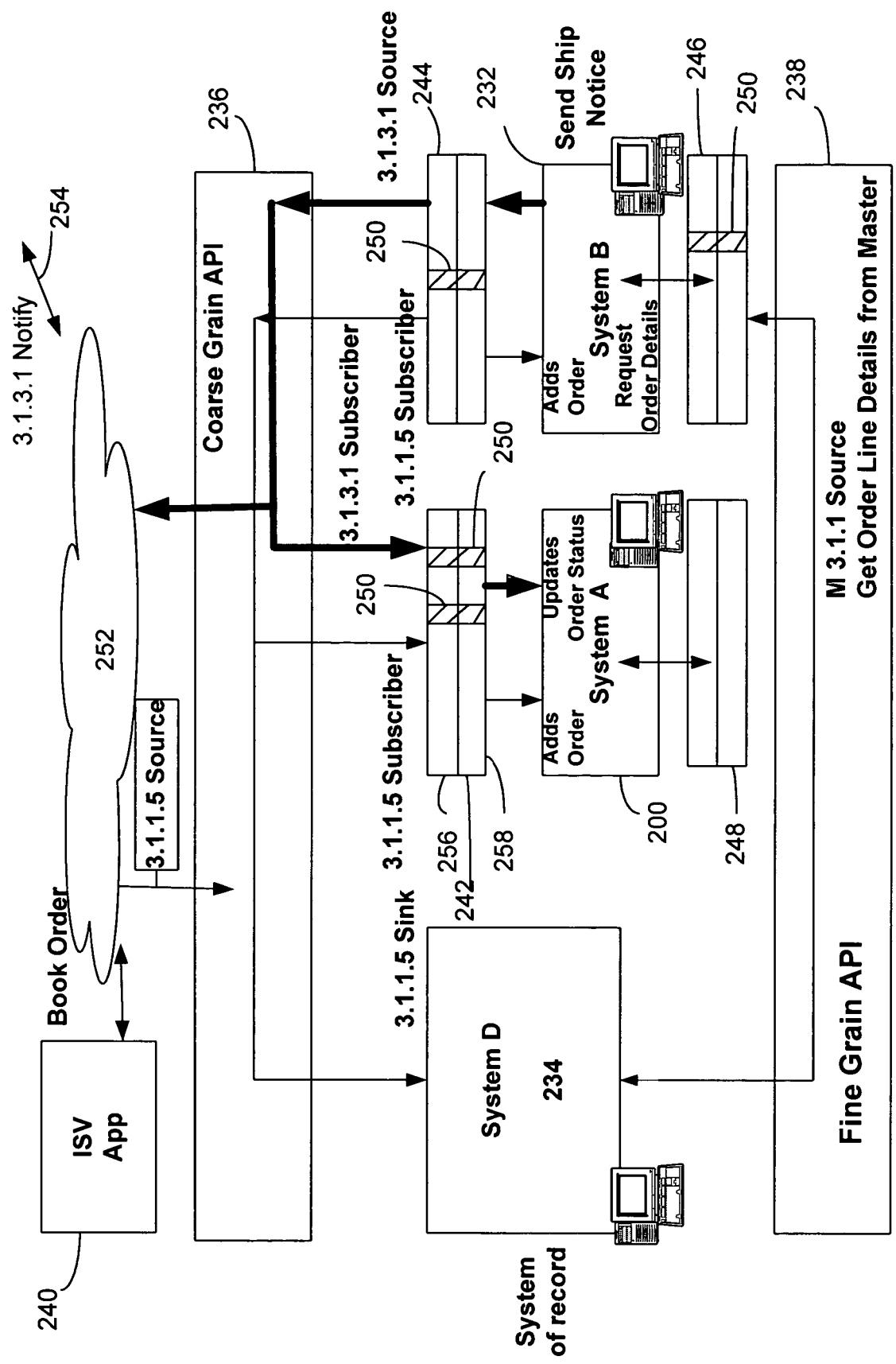
FIG. 4 is a diagrammatic view of a business software solution in accordance with one embodiment of the present invention.

FIG. 4 is a diagrammatic view of a business software solution in accordance with one embodiment of the present invention. FIG. 4 illustrates System A, B and D (200, 232, and 234, respectively) operating between a pair of application programming interfaces (coarse-grain API 236 and fine-grain API 238) to interact with a third-party application 240. One important concept of the embodiment illustrated in FIG. 4 is that it represents a large-scale, comprehensive, taxonomy of a business application. Specifically, the data types, object labels, event types, etc. of a business application are subjected to standardized classifications. Examples of such things include a standard way to describe the action of sending a shipping notice or sending a confirmation notice. It is this comprehensive business taxonomy that enables the definition of coarse-grain API 236 and fine-grain API 238 as well as the design and implementation of standardized adapters 242, 244, 246, and 248.

These adapters are standardized in the sense that they represent an acknowledgement of the comprehensive taxonomy embodied in API's 236 and 238. Specifically, each of the standardized adapters may include at least a notation, or stub for business objects and/or processes that are not supported by the stand-alone business software system. When such items are not supported, the standardized adapter will simply indicate such. Accordingly, as used herein, standardized adapter is intended to mean a software adapter to couple a stand-alone business software system to an over-arching business software solution wherein the standardized adapter is designed in accordance with a comprehensive business taxonomy. For illustration purposes, adaptations in each of adapters 242, 244, and 246 of non-supported items are shown as vertical stripes 250, standardized adapters 242, 244, 246, and 248 may also be referred to herein as gap-tooth adapters. The embodiment illustrated in FIG. 4 allows independent software vendors the ability to interact with a standardized, durable interface (via API's 236 and 238). This interface is considered durable in that it will be considered an interface contract in the sense that functions and objects designed to interact with the interface will always function. Accordingly, the interface comprising API's 236 and 238 will never get smaller; it will only grow thereby insuring backward compatibility. This will allow independent software providers to focus more of their resources on designing their own products, rather than spending considerable resources to generate interfaces from their product to the various API's and/or adapters in existence today.

It is preferred that the multiple systems 200, 232, and 234 interact with the model aware bus in the form of publisher/subscriber models. Thus, when a stand-alone business software application is installed, it will subscribe to the business actions or events to which it is able to process, and will indicate that it is a publisher of certain types of data and/or events based upon its own capabilities. As an example, FIG. 4 illustrates each of systems 200 and 232 connected to ISV App 240 via connection 252 and coarse-grain API 236. Each of systems 200 and 232 is able to respond to a type of event (for example book an order) and thus have subscribed to the Book.Order event. This event may be encoded numerically, for example, as business event 3.1.1.5. Application 240 acts as a source of information for the event; sending the event via the coarse-grain API on the bus, which receives the event and determines if any of the stand-alone systems to which it is coupled are subscribers of the event. In this case, both system 200 and 232 are subscribers and thus the event is passed to them by the bus. Separately, once the order is filled, system 200 needs to send an update order status event while system 232 requests order details via standardized adapter 246 and API 238 and then sends a ship notice (an event encoded as 3.1.3.1). Coarse-grain API 236 is used to send the ship notice from System B and sends an appropriate notification as indicated at arrow 254. Additionally, assuming that System D has been installed and configured as a source of order line details, API 238 is used to send the request order detail message to System D (234) which will reply via fine-grain API 238.

While a pair of application programming interfaces 236 and 238 is illustrated in FIG. 4, it is expressly contemplated that a single API could be provided that would include both such interfaces. Additionally, while standardized adapters will be designed to facilitate interaction between known stand-alone business software applications, development of such standardized adapters is simplified in that at least half of the adapter, for example, half 256 of adapter 242 is generated to interact with the standardized comprehensive interface. Only the half, 258, of adapter 242 will vary based upon the stand-alone software application. Further, as software providers began to adopt the comprehensive interface and other aspects of the present invention, stand-alone software systems will be provided that automatically interact with API's 236 and 238 without using standardized adapters. System D (234) is one such example.

In order to facilitate inter-system communication, fine-grain API 238 is also adapted to function as a replication interface. Essentially, interface 238 will receive, generally via software triggers, events from each of the stand-alone software systems. API 238 will then provide the requisite instructions and/or messages to the appropriate system based upon the publisher/subscriber model described above.

The comprehensive interface comprised of API's 236 and 238 also may include the functions of an administrative API which allows the selection and/or administration of software roles where two or more of the installed software applications overlap in their roles. Thus, one application may be instructed to not perform such role while the other is instructed to have that role enabled.

Thus, the interface created in accordance with an embodiment of the present invention provides one or more common APIs that provides the basis for a uniform automation capability. The interface is based on a shared, logical data model. Further, the interface provides support for adding a field or additional capabilities in a version-stable manner. Additionally, the stable interface is constructed in a way that it maintains stability as versions of the interface change. Additionally, the data models, API's and taxonomies are contemplated as being installable, so that the underlying software bus can be used to support more than one application domain model, enabling the bus to support one or more different, but standardized, business taxonomies, while providing a stable administrative and management toolset. Different application domain models can drive different domain-specific taxonomies. For example, a domain-specific comprehensive business taxonomy may be provided for the banking industry, while a different domain-specific comprehensive business taxonomy may be provided for the health care industry. Embodiments of the present invention include allowing the model-aware bus to be configurable to accommodate different versions or instances of comprehensive business taxonomies.

Figure 5:
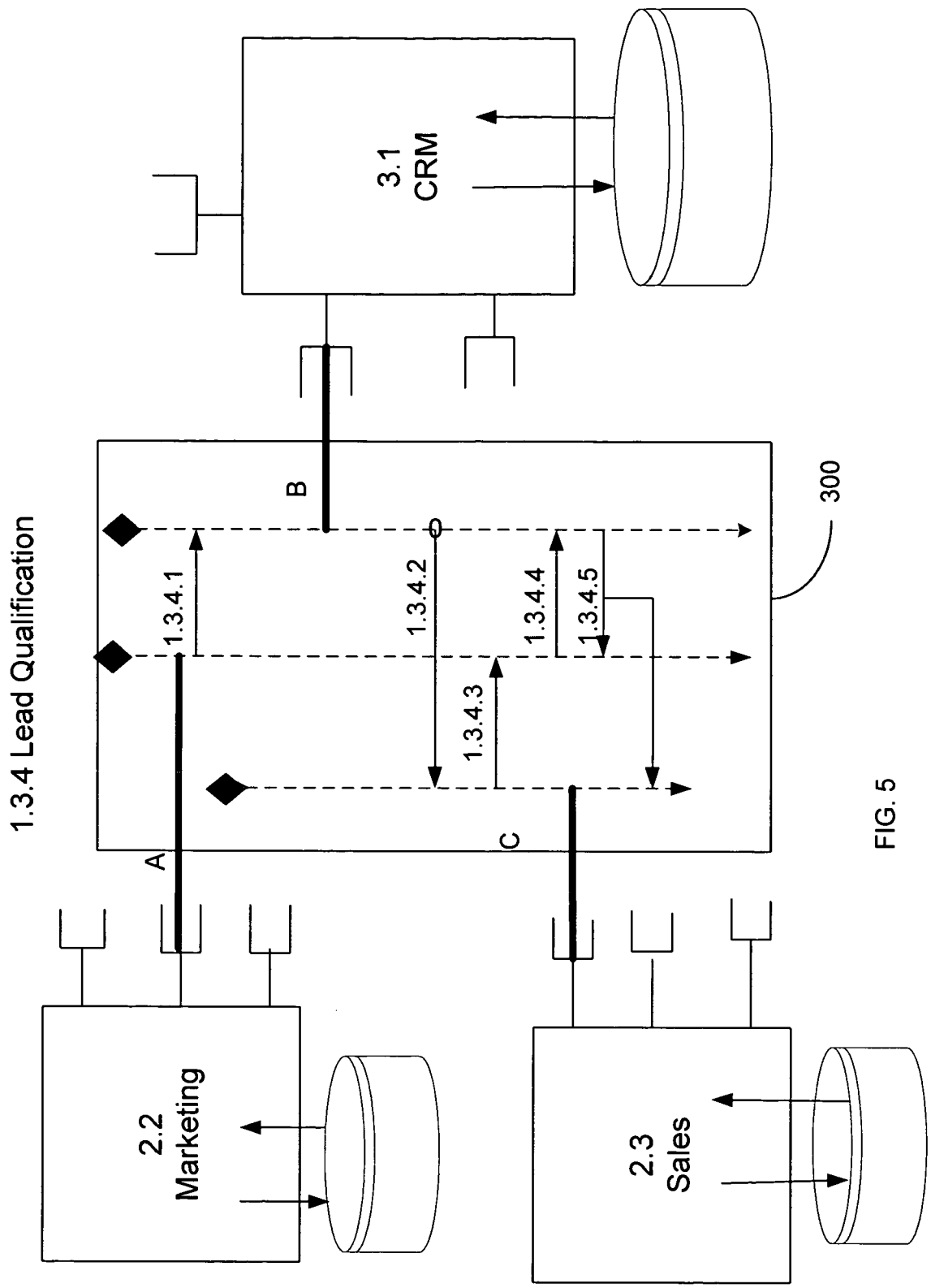
FIG. 5 is a diagrammatic view of an integrated business software solution in accordance with an embodiment of the present invention.

FIG. 5 is a diagrammatic view of an integrated business software solution in accordance with an embodiment of the present invention. As set forth above, one aspect of embodiments of the present invention is the provision of a standardized business taxonomy that allows virtually all aspects of a business to be classified and categorized in a standardized manner. This process can occur on many levels including high level classifications such as indicating that a piece of business software is part of a high level business function such as human relations or customer relations management (CRM). The application of taxonomy to the business extends all the way down to specification of individual data types for standardized business objects. This, for example, might mean that 'customer' is standardized in a given domain model to be an object, having, among other things, a first name no longer than a twenty-character string. Once all of these standardizations have been defined and installed in accordance with embodiments of the invention, developers are able to provide business software that can be integrated according to this software blueprint that the set of taxonomies define. In this regard, blueprint means that the business software can be integrated according to a pre-determined strategy and according to a stable interface as defined by the current and active business taxonomy.

FIG. 5 illustrates one example of this integration as enabled by a standardized taxonomy. Within one such business taxonomy, one standardized process might be, for example, lead qualification. This standardized business process is illustrated at block 300. According to the standardization, lead qualification may have a number of internal aspects, and may be required to receive one or more inputs and provide one or more outputs. Business software applications bind to the role of providing such information and/or receiving such information. Embodiments of the present invention can be considered to employ a model aware bus, in that it is able to react to changes in configuration and support multiple configurations. This bus includes multiple layers of cooperating infrastructure are provided both outside of the application domain with respect to integration/interoperability management and for run time services.

Embodiments of the present invention will generally employ six and optionally seven different forms of taxonomy. These taxonomies include module function; process function; process role; reference data; dependency; event data; and optionally key performance indicators.

An example of module function taxonomy essentially describes the grouping of business module functionality. An example of this description is describing a module as, for example, part or all of a Human Resources system, or all or part of a Customer Relationship Management system.

Process function taxonomy is used to describe the processes that can be performed by a given software application module. An example of this description is an indication that a module can participate in, for example, the lead qualification process illustrated with respect to FIG. 5.

Process role taxonomy is a description of the role played by the module in the business process. Extending the earlier lead qualification example, a particular application module would play the role of a submitter, or an approver.

Reference data taxonomy describes types of reference data made available to or required by an application.

Dependency taxonomy describes the intersection between the application or process and a given reference data or event data source. This also describes whether an intersection is a source or a sink for the described relationship. Examples of this dependency taxonomy include indications that the given application or process depends on, for example, customer data, and is used to determine whether the parts of a module that depend on there being an available source of customer data will function. If there is no source for customer data, the portions of embodiments of the invention that manage enabling or disabling parts of an installed application will prevent those dependent parts of the application from working. If a given module is totally dependent on a given process, data type, or other items from the business taxonomy, and those items are not present, the application will be disabled until those dependencies are satisfied. An example of this more restrictive dependency behavior includes an indication that the application or process requires a chart of accounts before it can operate.

Event data taxonomy describes types of events possible for consumption or production by a given application. An example of event data taxonomy, for example, is an indication that the application requires a copy of the change customer data event whenever changes are made to customer data via this event.

Finally, optional key performance indicators (KPI) taxonomy describes the type of key performance indicators available to a system. Examples of key performance indicators include items such as overall elapsed time to complete order fulfillment, on time deliveries, et cetera. These types of KPI's would not readily be visible to individual modules within an integrated suite of application components.

Figure 6:
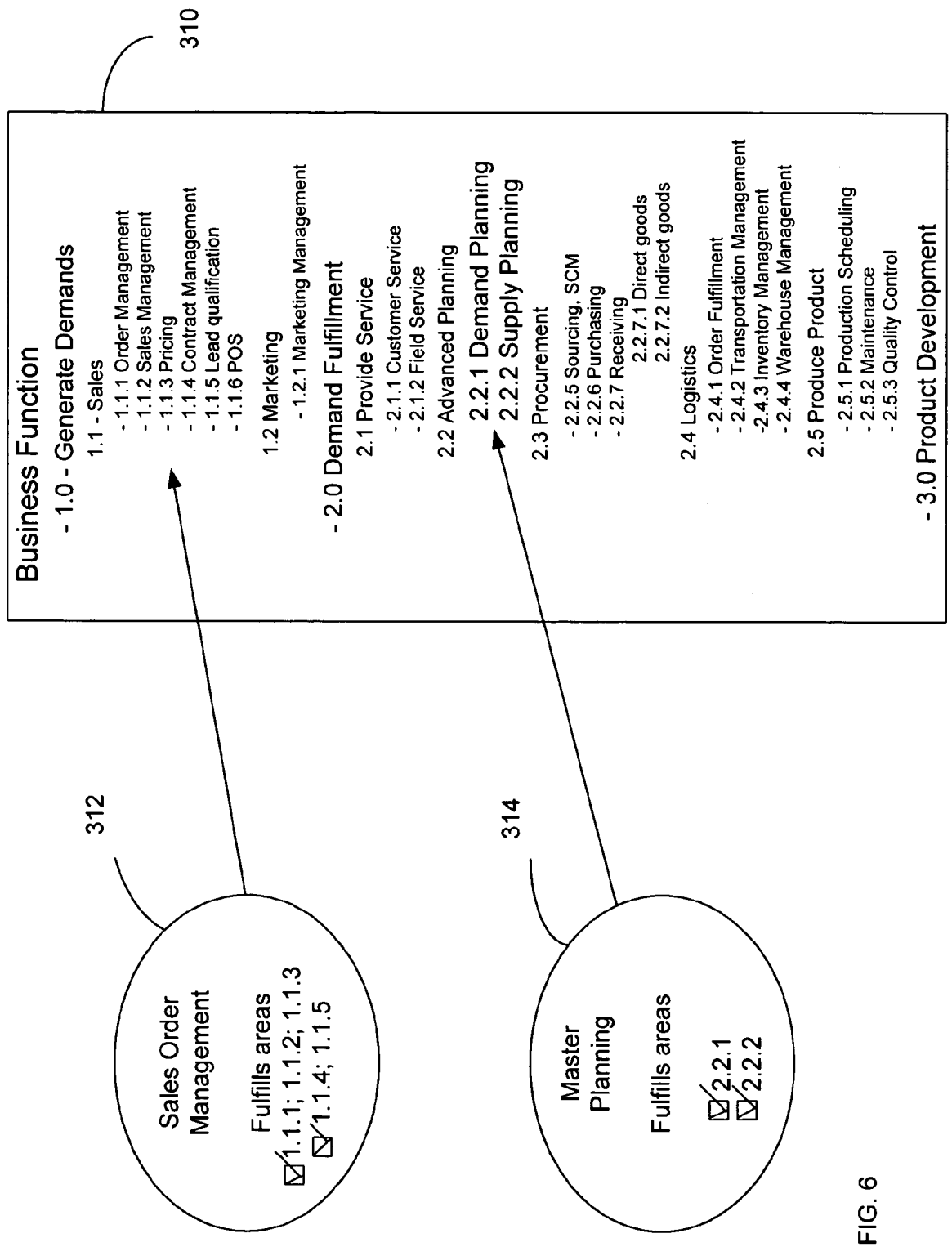
FIG. 6 is a diagrammatic view of a portion of a module map in accordance with embodiments of the present invention.

Several of these taxonomies are modeled in a module map. FIG. 6 is a diagrammatic view of a portion of a module map in accordance with embodiments of the present invention. Module map 310 simply contains an exhaustive list of all possible items in the business. FIG. 6 illustrates a pair of business software applications, 312, 314, which each fulfill different portions of the overall module map 310. Specifically, application 312 is designed to fulfill functions of order management, sales management, pricing, contract management, and lead qualification. During installation, or any other suitable discovery process, application 312 is queried to determine its capabilities. These capabilities are then bound to appropriate destinations by the embodiments of the invention based on being configured with taxonomies based on the module map in a manner that facilitates proper arbitration. FIG. 6 also illustrates application 312 fulfilling a different portion of module map 310. Specifically, application 314 is designed to provide demand planning and supply planning. This technique of managing business software capabilities also provides a way in which software of an entire business can be quickly and efficiently analyzed, for example by using an appropriate administrative tool designed to operate in conjunction with module map 310, to allow independent software vendors to identify and address opportunities to provide the business with additional or more appropriate business software.

Figure 7:
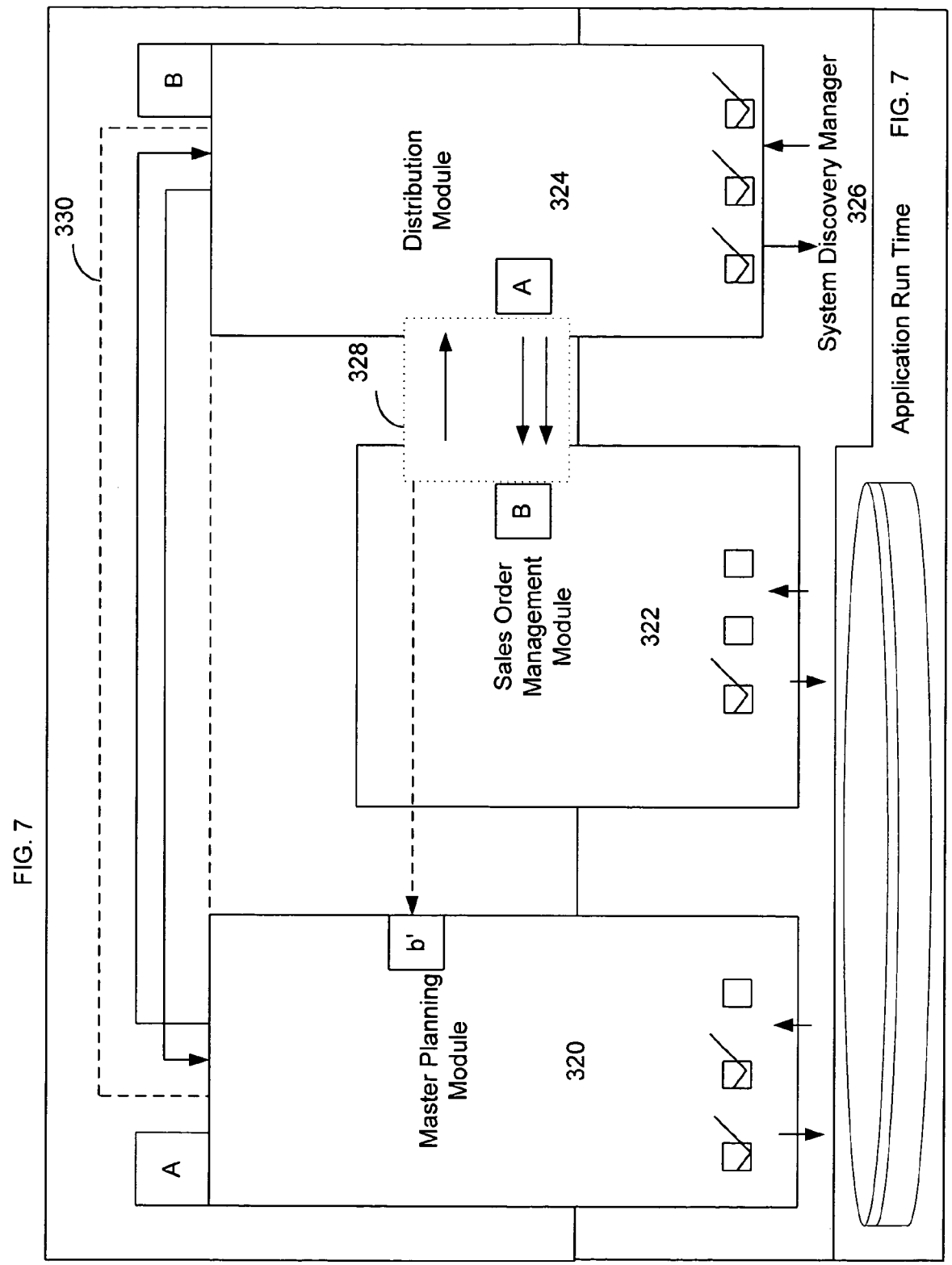
FIG. 7 is a diagrammatic view of business software applications deployed in a business software solution in accordance with an embodiment of the present invention.

FIG. 7 is a diagrammatic view of business software applications 320, 322, and 324 deployed in a business software solution in accordance with an embodiment of the present invention. Each of applications 320, 322, and 324 interact with system discovery manager (a component of the model aware bus) 326 such that the capabilities (illustrated diagrammatically as squares with check boxes) and non-capabilities (illustrated diagrammatically as empty squares) of each software application can be determined. Synergies are enabled by the recognition of the installation of cooperative software applications. For example, as illustrated in FIG. 7, when Sales Order Management Module 322 and Distribution Module 324 are installed, direct operations between the two modules can be enabled as illustrated at dashed square 328. Another synergy is evident in dashed box 330 between Master Planning Module 320 and Distribution Module 324.

In one sense, the model-aware bus used with embodiments of the present invention provides advantageous features on a number of layers. One layer is used to manage message routing. The routing layer is responsible for routing requests from callers to configured providers. Requests can take the form of asynchronous or synchronous (call/response or one-way call). The routing layer delivers requests based on the configured business process description defined in the model. Callers do not know destinations, nor are they directly linked with service providers. The routing layer serves as the final proxy/agent that arbitrates the delivery of requests between components and modules.

The pattern fitness layer is responsible for checking that the meta-data description provided by components at install time matches the requirements defined in the active model. The fitness check is invoked based on properties of the process description in the active model. A meticulously detailed process description will prevent the routing of requests from deviating from the flows dictated by the active model.

Another layer is the operations and administration layer. This layer provides the end customer premise operations staff with the means to manage a running plug-and-play application. This layer provides visibility into application health, independent of the geographic dispersal of application parts. Operators performing installations are notified when conflicts arise—whether between installed and to-be installed components, or between new components being installed and the process/role/message descriptions that are defined in the active model. Another example of a function provided by the operation management layer is checkpointing when significant changes are to be made to the business software system.

Another layer is the replication and mastering layer. This layer manages bulk flows of data during provisioning steps (set-up of a new replica, etc), bulk import, and the ongoing flows that are required to manage a distributed set of data stores that share common view of synchronized information.

Another layer is the tracking and auditing layer. This layer allows flows to be audited, traced, and debugged. Each module or component needs to eventually be capable of being placed into test or trace mode, and test result and trace data is written through this layer to a centralized tracking and auditing facility.

Finally, another layer can provide key performance indicators. This layer serves as a data observation and inference ability that allows flows between application components to be monitored as a source of information that is important to capturing the business health and other KPI data. Since the model defines the process interactions between models, the timing of events that are flowing between modules represents important business level performance data. This layer allows KPI's to be defined at the process black-box and white-box levels, and provides capture and reporting access across application modules.

Figure 8:
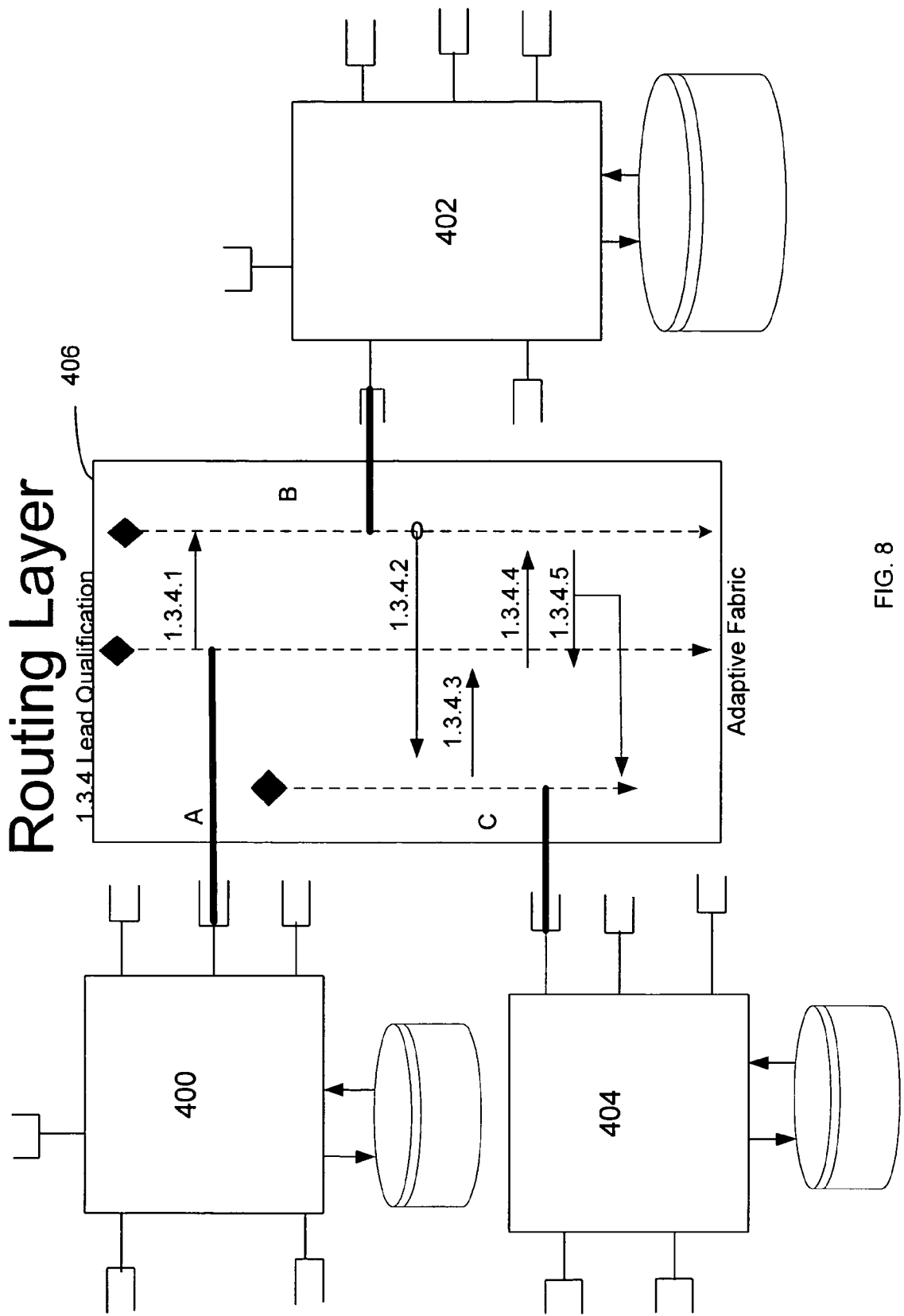
FIG. 8 is a diagrammatic view of a portion of a routing layer in accordance with an embodiment of the present invention.

FIG. 8 is a diagrammatic view of a portion of a routing layer in accordance with an embodiment of the present invention. Each of software applications 400, 402, and 404 has been built to the comprehensive business taxonomy described above. Accordingly, no additional middleware or adapters are required. The routing layer is one of the lower layers of the model-aware bus. It basically ensures that information flows properly between the different business software applications.

When software application 400 is installed, it provides metadata indicating that it can participate in a role of, for example, lead qualification, as indicated in FIG. 8. Due to this ability, an appropriate port of software application 400 will be bound to the suitable process role (process role A in FIG. 8). The metadata essentially identifies the business software application as a module. The metadata further identifies ports available for binding and the appropriate business processes with which those available ports may participate. For example, the port of business software application 400 that is bound to the lead qualification process may provide sourcing responsibility for role A, indicating that it can provide the required information to begin the process identified as 1.3.4.1. The metadata of application 400 may also indicate that it can source information for business process 1.3.4.4 as well as sink information for business processes 1.3.4.3. and 1.3.4.5. Those skilled in the art will recognize that ports of software application 400 are binding on roles of the routing layer versus binding on ports. When system 402 is installed, the metadata provided by system 402 indicates to the model-aware bus that system 402 is suitable to bind to role B on process 1.3.4. The metadata might indicate that application 402 can sink information for 1.3.4.1, source information for 1.3.4.2, sink information for 1.3.4.4, and source information for 1.3.4.5. When application 404 is installed, its metadata indicates that it is also suitable for binding to a role (role C) in the process illustrated in FIG. 8. Once these bindings have occurred, the process may potentially be activated. For example, application 400 wishing to submit a lead, may query the model-aware bus to see if the lead qualification process is enabled. Bus 406 can reply to the inquiry indicating that the destination exists for the lead submission. In response, application 400 can submit the lead to bus 406. Application 400 does not need to know the final destination of the lead submission information because that routing information is stored within the routing layer of the model-aware bus.

Figure 9:
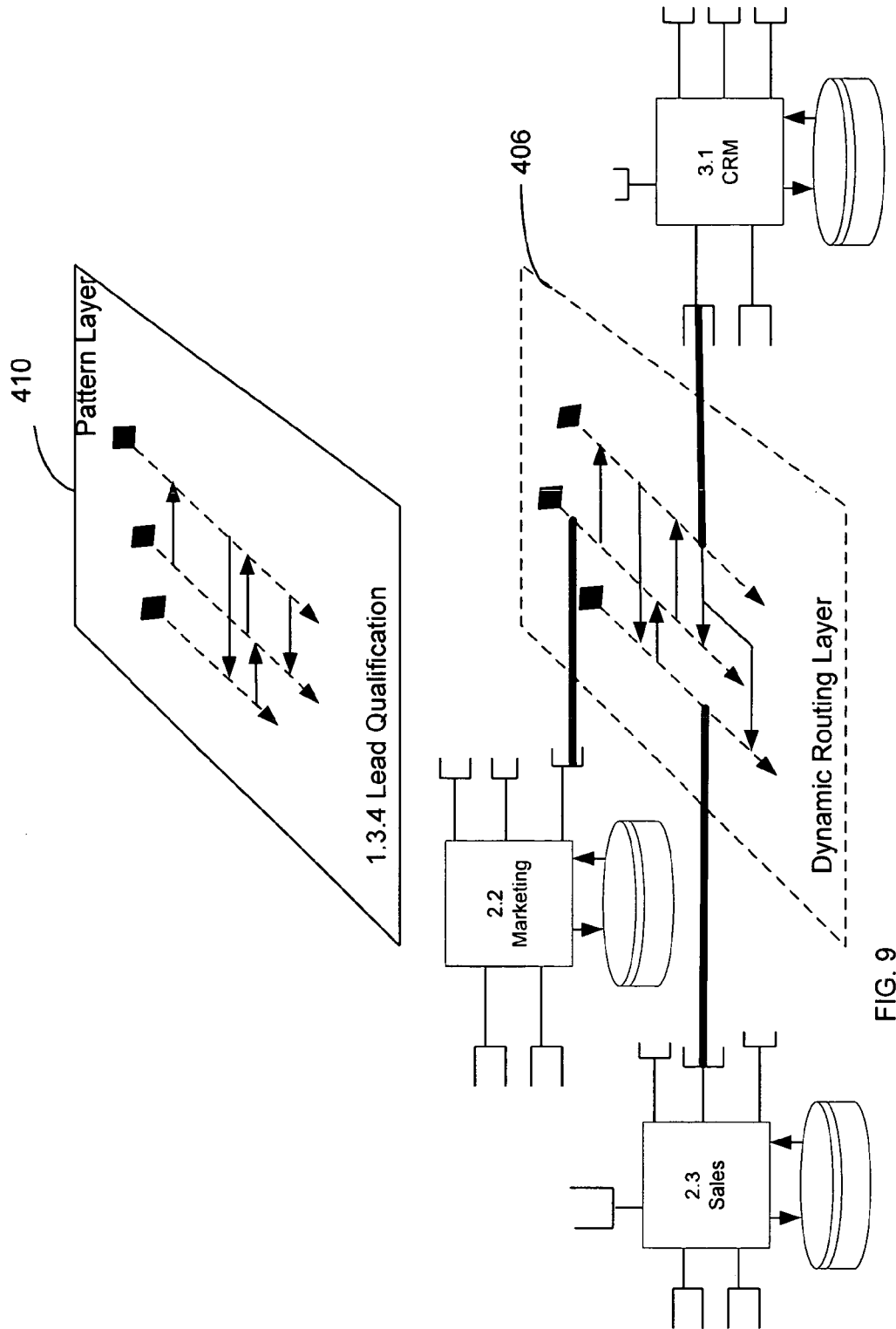
FIG. 9 is a diagrammatic view of a dynamic routing layer 406 discussed with respect to FIG. 8 in conjunction with pattern layer 410.

FIG. 9 is a diagrammatic view of a dynamic routing layer 406 discussed with respect to FIG. 8 in conjunction with pattern layer 410. Use of pattern layer 410 is used by the system to determine whether a business process (in this example lead qualification) can be enabled. Pattern 410 is pre-configured with data that can be compared with the metadata that was supplied by individual modules to determine whether the business process can function as required. Layer 410 is essentially a layer of what the process should be in terms of sources and sinks. Layer 410 is compared with layer 406 to determine whether roles are fulfilled. One of the benefits of having a separate layer 410 is that the types of roles can be more richly defined. For example, pattern 410 might include information that, for example, role C is absolutely required, and can only be fulfilled one time. Another form of role specification is that a role is optional and may be fulfilled zero to n times. Yet another type of role specification is that the role is optional, but that it may only be filled zero or one times. Additional types of role-specification can be used.

The operations and administration layer generally uses the metadata of the previous two layers (illustrated and described with respect to FIG. 9) to provide high level functions such as whether the entire software solution is ready for an operation. Additionally, this layer can be used to enumerate defined and installed process definitions. Additionally, this layer can be used to flag or otherwise identify processes that are not completely fulfilled. These identified processes can then be brought to the attention of an administrative user who can then determine, manually, whether to attempt to enable such processes in their current state, or take remedial action to complete the process.

The operations layer facilitates configuration, provisioning, testing, checkpointing, and potentially even rolling-back of software. This also allows an administrator to install, patch, upgrade, replace, repair, retire, and/or restore software relatively easy.

The 'model-aware bus' is a set of cooperating run-time services that enforce the system behaviors defined in a specific active model. The model-aware bus provides a generic mechanism for controlling the run-time behaviors defined in a model. Once a specific model is installed and marked as the active model instance, application modules, and individual components and services can be installed.

During installation, the meta-data provided by a given component is compared with the model. Depending on the settings of a local administrator, deviations from the model can be allowed or marked as deviations and disabled until further administrative action is taken.

At run time, flows between components take place based on the flow that the model describes. Senders, e.g. applications that have established role-based bindings to the bus, make requests to the bus, and based on the binding associated with a given component the information flows take place on the planned paths. Unplanned flows can be enabled administratively, or prevented altogether.

The design specification of the model-aware bus described above provides the technical interactions that bind a software component to the model-aware bus at runtime. By so binding, a component can begin interacting with other components, the bus itself, administrators and data services. Once a component is bound, the module interface design governs the business process and data interactions that are allowed.

The module interface, as defined by the taxonomies used to configure an instance of the bus, provides the convention that all components adhere to in order to achieve essentially plug-and-play interactions with other modules, as well as to allow the system itself to interact with any given module. The module interfaces themselves also expose a module specific set of capabilities in the form of services, user interface elements, and process interaction capabilities. Each of these reflects the expected behaviors that are defined by the domain specific model designer.

The following section focuses on the design elements that are generally common to all modules in order to facilitate plug-and-play capabilities.

One important aspect of embodiments of the present invention is the discovery process and initial setup interactions. This includes the way a component or module engages with the model-aware bus when the component or module is installed, configured, activated or de-activated. The primary interaction occurs when a new module, consisting of one or more components, is introduced to the run-time environment. During setup, the metadata that describes each component's business purpose, abilities, dependencies, roles, etc. is read from the each component being installed, and then compared against the manifest of installed items that are being managed by the model-aware bus, as well as the model information that is present within the bus model store.

During setup, the runtime aspects of the model-aware bus determine whether the components being installed are known to the model. Several cases are possible and a brief description of each follows. One situation occurs when a new module is being installed, and that module's meta-data corresponds with the meta-data of the model that is controlling the target runtime environment. In this situation, the module and its components are placed into a "waiting activation" state. From this state, the module and its components can be promoted to an active state by administrative action.

Another situation occurs when the new module does not match expectations for a modeled element. When a new module is being installed, and that module's meta-data does not meet the requirements laid out in the current model, the module and its components are placed into a "Disabled-Mismatch" state. From the mismatch state, administrative action is required to either uninstall the unsuitable component, or to authorize a deviation from the planned mode (thereby creating an ad-hoc extension ability). The degree to which the module is out of alignment with the overall model will play a role in how successful a deviation authorization will be. The runtime architecture should accommodate a certain degree of deviation; as well as provide the model designer and the administrator some control over how closely elements need to match the runtime description.

Another situation occurs when the new module describes an un-modeled capability. When a new module is being installed, and that module's meta-data defines an extension to a specific target model that is controlling the run-time, the module is placed into an "Approval waiting" state. An administrative action can allow the new module to be moved to the "waiting activation state" after a model extension is added to the runtime environment.

Process binding and inspection play an important role in embodiments of the present invention. One of the tenets of a set of software modules that are automatically configurable is that the components that make up a specific module will interact with other components via well defined, or modeled, business process interactions. In the simple case, one component interacts with another in a one to one relationship, with each component playing a role (e.g. caller and called) on a specific service request.

In another case, two components wind up interacting in a complex sequence of request/response actions as part of a long running transaction sequence, or process. Note that each interacting component binds to a specific role on the process as described above. This binding requirement is communicated to the bus as part of the meta-data that each component provides during set-up. When the pair of components are placed into an active state, the process description from the model plays a role in the activation step. Assuming that the meta-data describing the expectations of each model matches the meta-data that defines the process in the active model, the activation can succeed, and the two modules can communicate as planned.

The benefits of this approach, binding to roles on processes instead of remote components, include uncoupling and better run-time management.

Uncoupling is achieved because the caller no longer maintains information about the location or route to partner components. A module only cares that a specific interaction is available or not. Since the process itself knows what roles are active (by tracking this via the runtime) a caller can determine if a service request can be made before blindly making the request.

Better runtime management is achieved because components are bound to process roles. If a component that is bound to a specific process role is placed into a disabled state at runtime, or perhaps uninstalled, the process may also be placed into a disabled state, depending on the description of the role in the process. Optional roles can be activated and deactivated without processes being affected.

Embodiments of the present invention also facilitate process monitoring. By going through an intermediate routing layer that actively governs a process flow, individual flows are able to be instrumented, monitored and measured without having to put monitoring and measurement logic into the individual modules. A more consistent operation monitoring environment results from this approach.

Embodiments of the present invention also increase process flexibility because individual components only know about the role they play in a process. Accordingly, the process itself can be modified (if allowed by the administrative settings on the active model) and extended with new roles without introducing breaking conditions or code-change requirements into the individual components. The approach extends itself readily to more complex processes involving more than one role, as well as other response patterns (one way, notifications, subscriptions, broadcast, asynchronous request/response, and n-way return routes).

As described above, embodiments of the present invention generally use metadata to describe module capabilities and requirements. One of the pieces of metadata that a module or component should signal for essentially plug-and-play functionality is a list of capabilities that must be present or are optional for a given module to function. Another piece of metadata is an indication of the abilities being offered by a given component or module. Metadata also includes dependency metadata, which outlines the types of dependency metadata that needs to be provided by modules during installation. This data should be discoverable, either by a query-interface-for-dependency type interface, or by examining a shared discovery capability that reflects the various configuration states in the run-time. Embodiments of the present invention include both approaches to discovery. Types of dependency metadata that should be considered regarding this interface include document sources/data dependencies; model version target; process presence in the active model; process role presence; process role interdependencies; and component or service presence.

Document, event and data dependencies define the types of data and document sources that must be present in order for the module or component to function properly. Whether a dependency is required or optional should also be indicated.

Another aspect of embodiments of the invention is the presumption that individual modules will be built to a specific model target—that is for a given application domain model that can be used to configure embodiments of the invention, the developer of a given module will pre-build the software to an assumption that a specific version of a model must be present at run-time for the software to properly function. Model version target metadata specifies the "desired" model version target for a software application or module, and should be able to specify secondary choices and preference order for binding purposes. If a particular model version is required, this should be indicated.

Process presence is the ability for a module to be developed so that during installation or at run time, it can query the model-aware bus for the status of a specific process, as defined by an identifier found in the process taxonomy. This metadata controls whether a module is able to bind to one or more process definitions. When a module or component is activated, this information is used to guide the system configuration steps. If a process presence is required or optional should be indicated.

Process-Role presence metadata specifies the process roles that the module is willing and able to take on.

Process role interdependencies metadata specifies the relationship between binding role assignments. This information allows for specifying "all-or-nothing" binding relationships so that individual plug-and-play components are not intermixed in ways that do not make sense.

Component or service presence metadata specifies whether specific component implementations or service presence is required. This data is preferably expressed in terms of logical abilities based on contract definitions.

Metadata descriptions are one way that generic descriptions of module capabilities and requirements are provided in embodiments of the present invention. Another important function that helps facilitate generic communication between each module and the bus, as well as between different modules is the messaging layer. In order to meet the goals of essentially plug and play operation, model driven applications should work together with a common signaling approach that covers module and component communications, error management, two-phase-commit transaction management, and operations control. The message structures themselves should follow a prescriptive design so that different development teams in different geographies can develop model driven application components that behave consistently.

The following description is an illustrative example of a messaging specification in accordance with an embodiment of the present invention. The design of a message set for plug-and-play application modules connected by a model-aware bus relies on a stable core data model for the application domain and control structures. The core data model provides the common, cross-domain definition of individual application data types. The requirement for data model stability addresses the diverse nature of business applications. Individual applications are specialized, and it is usual for each application to be installed on its own set of servers. Sales offices, factories and headquarters rarely are co-located and wind up cities away.

These geographically dispersed installations not only introduce synchronization latencies and the need to continue operating when networks or servers are down, but they also introduce separate budget cycles that assure that entire systems are rarely ever updated with new versions of software at the same time.

Model designers express the core data model in a standardized manner, such as XML, by defining schema element definitions for each core concept in the application domain. These schema definitions are later used as the basis for the message domain model.

The message domain model defines the message structures that are shared between the components that make up the model-defined modules in a specific model domain. The message domain model is a collection of individual message definitions that are each preferably expressed in XML schema. Each of these schemas inherits from the model construct called moduleMessage. The moduleMessage definition provides the framework that defines the structure that is common to all domain messages. The moduleMessage definition provides the following common message abilities: control header, fidelity layering, post deployment message extension, and multipart message handling. Control header defines the elements of a message that manage identity, idempotent behavior, concurrency, data versioning, correlation, n-way conversations, and transaction involvement. Fidelity layering addresses the need to layer in area specific extensions to core elements defined for a given message or document type. This defines the approach for identifying a layered extension to a core document, identifying the core being extended, and versioning. Post deployment message extension defines how a message will support "add-a-field" scenarios. Finally, multipart messages section defines how a message will be marked to signify that a specific message instance is part n of m related messages. Message parts of this type are managed by the application.

The following description provides additional details regarding messaging features that should be supported in the control elements that are present in each message. For illustration, suggested designs are represented as XML. Message control elements are grouped into a logical notion of a "control header". Preferably this is an XML element that is contained in the payload that is transmitted in accordance with a standard protocol such as Simple Object Access Protocol (SOAP). The reason this is in the payload rather than in a SOAP:Header is to prevent application-level control elements from being stripped from the SOAP message as most SOAP processing instances do today.

The elements defined below are preferably all contained in a common control header element named controlHeader.

EXAMPLE

<ch:controlHeader xmlns:ch="urn:schemas_microsoft_com:controlHeader:vl"/>

The controlHeader has the following message elements: messageType and messageInstanceIdentity. In order to expedite the routing of messages, the control header has an overt indicator of the message type. Message type is used by the model-driven bus to identify and route the message itself. Message type information is placed in the mandatory attribute named messageType.

EXAMPLE

```
<ch:controlHeader xmlns:ch="urn:schemas_microsoft_com:controlHeader:vl" messageType="messageURI">
    . . .
</ch:controlHeader>
```

MessageInstanceIdentity defines the instance of a unique "send" on the part of the application, and does not represent an individual transmission attempt. The application layer is responsible for assigning a unique identifier to each message. Message instance is defined in the element named messageID.

EXAMPLE

```
<ch:controlHeader xmlns:ch="urn:schemas_microsoft_com:controlHeader:vl" messageType="messageURI">
    <ch:messageID
    context="senderContextlD">uniqueID</ch:MessageID
    >
    . . .
</ch:controlHeader>
```

The mandatory attribute named senderContext is used to specify the sending application and/or module context. The value in the context field should be one of the registered sender contexts known to the model-aware bus at run-time. This will normally be the module instance identifier created when a module is installed. The value in this attribute, plus the unique identifier value in the messageID element together make up a unique message instance identity.

Idempotent transmission across two partnering modules or components is enabled by the information passed in the message instance identity. At run-time, it is the responsibility of the receiving partner to be aware of the possibility of message replay so as to prevent a replay situation from causing double processing of a given message.

In order to facilitate tracing, sorting and ordering of threads of messages, it is necessary to establish some sort of ordering mechanism. The preferred mechanism is the transmission time of the original request. Transmission time stamping is a function done by the sender. The timestamp element is used to express transmission time. The granularity is preferably down to the second.

EXAMPLE

```
<ch:controlHeader
    xmlns:ch="urn:schemas_microsoft_com:controlHeader:v1"
    messageType
        ="messageURI">
    <ch:messageID
    context="senderContextID">uniqueID</ch:MessageID>
    <ch:timestamp instant="2003-06-13T14:21:00Z/>
```

The timestamp element has a mandatory instant attribute that is formatted in XML dateTime notation. The sending application will preferably represent the timestamp in using Zulu notation, that is, with the timezone component converted to Greenwich Mean Time (GMT).

Reconciliation of request and response semantics is a common business activity. In order to mark a message as the direct logical descendent, the optional element named pertainsToID is provided for matching requests with responses.

EXAMPLE

```
<ch:controlHeader
    xmlns:ch="urn:schemas_microsoft_com:controlHeader:v1"
    messageType
        ="messageURI">
    <ch:messageID
        context="responderContextID">uniqueID</ch:M
    essageID> <ch:timestamp instant="2003-06-
    13T14:21:30Z/>
    <ch:pertainsToID
        context="originalContextID">uniqueID</ch:pa
    rentID>
        ...
    </ch:controlHeader>
```

The example shows the control-header content of a response to an earlier request. A response message is still a message, so it has its own unique message instance identifier. Because this is a direct response, a parentID element is added to the control header. This parentID element is populated with the values originally passed in the messageID field in the request message. If a message being sent by a module is not a direct response, based on the requirements defined in the domain model, then the parentID element is not present.

Embodiments of the present invention allow entire stand-alone business software systems and/or components thereof to be installed and managed automatically. In this sense, the installation and operation of these pieces of software can be thought of as plug-and-play. The ease of integration and operation provided by embodiments of the present invention will facilitate the acquisition and deployment of new and improved business software as such software becomes available.

Although the present invention has been described with reference to particular embodiments, workers skilled in the art will recognize that changes may be made in form and detail without departing from the spirit and scope of the invention.

What is claimed is:

1. A method of operating a plurality of business software components, the method comprising:

discovering information about a first stand-alone business software application, the first business software application having at least one first component capability or first component requirement;

binding the at least one first component capability or first component requirement to a first role in a model-driven bus;

discovering information about a second stand-alone business software application, the second business software application having at least one second component capability or second component requirement;

providing standardized messaging between the first and second stand-alone business software applications wherein the first and second stand-alone business software applications interact with the model-driven bus in the form of a publisher/subscriber model;

binding the at least one second component capability or second component requirement to a second role in a model-driven bus;

wherein at least one capability of the first stand-alone business software application overlaps at least one capability of the second stand-alone business software application and wherein the model-driven bus provides arbitration such that only one of the first and second stand-alone business software applications provides the overlapping capability; and examining role bindings to determine if a business process can be enabled.

2. The method of claim 1, wherein the step of discovering information about the first stand-alone business software application is performed by a discovery manager.

3. The method of claim 2, wherein the step of discovering information about the second stand-alone business software application is performed by a discovery manager.

4. The method of claim 1, wherein the step of discovering information about the first stand-alone business software occurs automatically.

5. The method of claim 4, wherein the step of discovering information about the second stand-alone business software occurs automatically.

6. The method of claim 4, wherein the automatic discovery occurs as part of installation of the first stand-alone business software.

7. The method of claim 1, wherein the information about the first stand-alone business software is metadata.

8. The method of claim 7, wherein the information about the second stand-alone business application is metadata.

9. The method of claim 1, wherein examining includes comparing process role bindings to predefined process pattern information.

10. The method of claim 9, wherein the predefined process pattern information is part of a pattern fitness layer.

\* \* \* \* \*

UNITED STATES PATENT AND TRADEMARK OFFICE
CERTIFICATE OF CORRECTION

| | | |
|---|---|---|
| PATENT NO. | : 7,395,540 B2 | |
| APPLICATION NO. | : 10/726879 | |
| DATED | : July 1, 2008 | |
| INVENTOR(S) | : Daniel J. Rogers | |

It is certified that error appears in the above-identified patent and that said Letters Patent is hereby corrected as shown below:

In column 20, line 15, in Claim 1, after "application" insert -- , --.

Signed and Sealed this
Nineteenth Day of April, 2011

David J. Kappos
*Director of the United States Patent and Trademark Office*